US011181023B2

(12) United States Patent
Cravillon et al.

(10) Patent No.: US 11,181,023 B2
(45) Date of Patent: Nov. 23, 2021

(54) FOUR WAY CONVERSION CATALYSTS FOR GASOLINE ENGINE EMISSIONS TREATMENT SYSTEMS

(71) Applicant: BASF Corporation, Florham Park, NJ (US)

(72) Inventors: Janosch Cravillon, Hannover (DE); Stephan Siemund, Hannover (DE); Attilio Siani, Shanghai (CN); Thomas Schmitz, Hannover (DE); Oliver Seel, Nienburg/Weser (DE); Knut Wassermann, Union, NJ (US)

(73) Assignee: BASF Corporation, Florham Park, NJ (US)

( * ) Notice: Subject to any disclaimer, the term of this patent is extended or adjusted under 35 U.S.C. 154(b) by 153 days.

(21) Appl. No.: 16/322,171

(22) PCT Filed: Jul. 25, 2017

(86) PCT No.: PCT/EP2017/068776
§ 371 (c)(1),
(2) Date: Jan. 31, 2019

(87) PCT Pub. No.: WO2018/024547
PCT Pub. Date: Feb. 8, 2018

(65) Prior Publication Data
US 2020/0182115 A1 Jun. 11, 2020

(30) Foreign Application Priority Data

Aug. 5, 2016 (EP) .................................. 16182968

(51) Int. Cl.
*F01N 3/10* (2006.01)
*B01D 46/00* (2006.01)
(Continued)

(52) U.S. Cl.
CPC ......... *F01N 3/101* (2013.01); *B01D 46/0001* (2013.01); *B01D 46/0027* (2013.01);
(Continued)

(58) Field of Classification Search
CPC combination set(s) only.
See application file for complete search history.

(56) References Cited

U.S. PATENT DOCUMENTS

| 4,171,288 A | 10/1979 | Keith et al. | |
| 8,173,087 B2 * | 5/2012 | Wei | F01N 3/033 423/213.2 |

(Continued)

FOREIGN PATENT DOCUMENTS

| CN | 102939445 A | 2/2013 |
| EP | 2 042 226 A2 | 4/2009 |

(Continued)

OTHER PUBLICATIONS

International Search Report and Written Opinion dated Oct. 17, 2017 in PCT/EP2017/068776 filed on Jul. 25, 2017.

(Continued)

*Primary Examiner* — Binh Q Tran
(74) *Attorney, Agent, or Firm* — Finnegan, Henderson, Farabow, Garrett & Dunner LLP

(57) ABSTRACT

Catalyzed particulate filters comprise three-way conversion (TWC) catalytic material that permeates walls of a particulate filter such that the catalyzed particulate filter has a coated porosity that is less than an uncoated porosity of the particulate filter. The coated porosity is linearly proportional to a washcoat loading of the TWC catalytic material. A coated backpressure is non-detrimental to performance of the engine. Such catalyzed particulate filters may be used in an emission treatment system downstream of a gasoline direct injection engine for treatment of an exhaust stream (Continued)

comprising hydrocarbons, carbon monoxide, nitrogen oxides, and particulates.

20 Claims, 5 Drawing Sheets

(51) Int. Cl.
*B01D 46/24* (2006.01)
*B01D 53/94* (2006.01)
*B01J 21/04* (2006.01)
*B01J 23/58* (2006.01)
*B01J 35/04* (2006.01)
*B01J 35/10* (2006.01)
*B01J 37/02* (2006.01)
*B01J 37/04* (2006.01)
*B01J 37/08* (2006.01)
*F01N 3/022* (2006.01)
*F01N 3/035* (2006.01)
*F01N 3/28* (2006.01)

(52) U.S. Cl.
CPC ..... *B01D 46/2429* (2013.01); *B01D 53/9454* (2013.01); *B01J 21/04* (2013.01); *B01J 23/58* (2013.01); *B01J 35/04* (2013.01); *B01J 35/1076* (2013.01); *B01J 37/0221* (2013.01); *B01J 37/0228* (2013.01); *B01J 37/0248* (2013.01); *B01J 37/04* (2013.01); *B01J 37/088* (2013.01); *F01N 3/0222* (2013.01); *F01N 3/035* (2013.01); *F01N 3/2828* (2013.01); *B01D 2279/30* (2013.01); *F01N 2330/06* (2013.01); *F01N 2330/30* (2013.01); *F01N 2510/068* (2013.01)

(56) References Cited

U.S. PATENT DOCUMENTS

| | | | |
|---|---|---|---|
| 8,815,189 | B2 | 8/2014 | Arnold et al. |
| 9,352,279 | B2* | 5/2016 | Greenwell ............... B01J 35/10 |
| 9,581,063 | B2* | 2/2017 | Klingmann ............ B01J 37/038 |
| 2008/0044319 | A1 | 2/2008 | Takahashi et al. |
| 2009/0049815 | A1 | 2/2009 | Beall et al. |
| 2009/0087365 | A1 | 4/2009 | Klingmann et al. |
| 2009/0193796 | A1 | 8/2009 | Wei et al. |
| 2010/0239478 | A1 | 9/2010 | Arnold et al. |
| 2011/0030346 | A1 | 2/2011 | Neubauer et al. |
| 2011/0158871 | A1 | 6/2011 | Arnold et al. |
| 2011/0252773 | A1* | 10/2011 | Arnold ................ B01J 35/1076 60/297 |
| 2012/0097033 | A1 | 4/2012 | Arnold et al. |
| 2013/0167513 | A1* | 7/2013 | Cattani ..................... F01N 3/10 60/286 |
| 2014/0186228 | A1 | 7/2014 | Arnold et al. |
| 2015/0107228 | A1 | 4/2015 | Klingmann et al. |
| 2015/0152768 | A1* | 6/2015 | Arulraj ................ B01J 37/0246 428/117 |
| 2016/0193594 | A1 | 7/2016 | Arnold et al. |
| 2018/0266289 | A1 | 9/2018 | Otsuka et al. |

FOREIGN PATENT DOCUMENTS

| | | |
|---|---|---|
| EP | 2 650 042 A1 | 10/2013 |
| GB | 2468210 A | 9/2010 |
| JP | 2013-530332 A | 7/2013 |
| JP | 2014/509244 A | 4/2014 |
| WO | WO2011/133503 A2 | 10/2011 |
| WO | WO2012/071338 A2 | 5/2012 |
| WO | WO2015/145122 A2 | 10/2015 |
| WO | WO2017/051459 A2 | 3/2017 |

OTHER PUBLICATIONS

U.S. Appl. No. 15/546,953, filed Feb. 12, 2019, U.S. Pat. No. 10,201,804, Karpov, et al.
U.S. Appl. No. 15/503,903, filed Apr. 3, 2018, U.S. Pat. No. 9,931,596, Zheng, et al.
U.S. Appl. No. 15/752,968, filed Aug. 16, 2018, 2018/0229224, Zheng, et al.
U.S. Appl. No. 15/546,836, filed Jan. 22, 2019, U.S. Pat. No. 10,183,276, Karpov, et al.
U.S. Appl. No. 16/062,256, filed Dec. 20, 2018, 2018/0361360, Xue, et al.
U.S. Appl. No. 16/323,148, filed Feb. 4, 2019, Cravillion, et al.
International Preliminary Report on Patentability and Written Opinion dated Feb. 14, 2019 in PCT/EP2017/068776, 11 pages.

* cited by examiner

FRONT

MIDDLE

REAR

FRONT

MIDDLE

REAR

FRONT

MIDDLE

REAR

FOUR WAY CONVERSION CATALYSTS FOR GASOLINE ENGINE EMISSIONS TREATMENT SYSTEMS

TECHNICAL FIELD

This invention pertains generally to emission treatment systems having catalysts used to treat gaseous streams of gasoline engines containing hydrocarbons, carbon monoxide, and oxides of nitrogen in conjunction with particulates. More specifically, this invention is directed to a four-way converter (FWC), which comprises a three-way conversion (TWC) catalyst and a particulate filter.

BACKGROUND

Particulate emissions for gasoline engines are being subject to regulations, including Euro 6 (2014) standards. Certain gasoline direct injection (GDI) engines have been developed whose operating regimes result in the formation of fine particulates. Aftertreatment systems for gasoline engines need to achieve particulate matter standards. In contrast to particulates generated by diesel lean burning engines, the particulates generated by gasoline engines, such as GDI engines, tend to be finer and in lesser quantities. This is due to the different combustion conditions of a diesel engine as compared to a gasoline engine. For example, gasoline engines run at a higher temperature than diesel engines. Also, hydrocarbon components are different in the emissions of gasoline engines as compared to diesel engines.

Emissions of unburned hydrocarbons, carbon monoxide and nitrogen oxide contaminants continue to be regulated. Catalytic converters containing a three-way conversion (TWC) catalyst are accordingly located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

A catalyzed particulate trap comprising a TWC catalyst coated onto or within a particulate trap is provided in U.S. Pat. No. 8,173,087 (Wei). The TWC catalyst can be coated on an inlet side, an outlet side, or both of the filter. U.S. Pat. No. 8,173,087 identifies that some of the particulates from a GDI gasoline engine could avoid being trapped by the filter by flowing though the filter walls when the filter is fresh and that to deal with the initial filtration efficiency problem, a thin layer of catalytic washcoat can be coated onto the filter wall. A gasoline engine emissions treatment system having particulate filters is also provided in U.S. Pat. No. 8,815,189 (Arnold). The three-way conversion (TWC) catalysts or oxidation catalysts of U.S. Pat. No. 8,815,189 are coated onto and within a particulate filter, which has a coated porosity that is substantially the same as its uncoated porosity.

Emissions technologies are limited by backpressure and volume constraints of exhaust systems. That is, within defined backpressures and volumes, any new technologies should have minimal to no impact on either.

There is a continuing need to provide a catalyzed filter that provides sufficient TWC in conjunction with an efficient filter without unduly increasing backpressure so that regulated HC, NOx, and CO conversions can be achieved while meeting particulate matter emissions.

SUMMARY

Provided are exhaust systems and components suitable for use in conjunction with gasoline engines to capture particulates in addition to treating gaseous emissions such as hydrocarbons, nitrogen oxides, and carbon monoxides. Of interest is providing a particulate filter for gasoline engines (GPFs or PFGs) that provides full three-way conversion (TWC) functionality with minimal impact on backpressure.

In a first aspect, provided is an emission treatment system downstream of a gasoline direct injection engine for treatment of an exhaust stream comprising hydrocarbons, carbon monoxide, nitrogen oxides, and particulates, the emission treatment system comprising a catalyzed particulate filter comprising:

a three-way conversion (TWC) catalytic material that permeates walls of a particulate filter;

wherein the catalyzed particulate filter has a coated porosity that is less than an uncoated porosity of the particulate filter.

In one or more embodiments, there is no layering of the catalytic material on the surface of the walls of the particulate filter except optionally in areas of overlapped washcoat. The coated porosity may be linearly proportional to a washcoat loading of the TWC catalytic material. The coated porosity may be between 75 and 98% of the uncoated porosity. The coated porosity may be between 80 and 95% of the uncoated porosity. The coated porosity may be between 80 and less than 93% of the uncoated porosity. A coated backpressure of the catalyzed particulate filter is generally non-detrimental to performance of the engine.

For a washcoat loading of up to about 60 g/L, the catalyzed particulate filter may have a coated backpressure of that is less than or equal to a 15%±3% increase compared to an uncoated backpressure.

In a detailed embodiment, the particulate filter comprises 200-300 cells per square inch (CPSI) and a wall thickness in the range of 6-14 mil, the catalyzed particulate filter has a coated backpressure of that is less than or equal to a 50% increase compared to an uncoated backpressure.

The particulate filter may comprise a mean pore diameter in the range of about 13 to about 25 μm. The particulate filter may comprise a wall thickness in the range of about 6 mils (152 μm) to about 14 mils (356 μm) and an uncoated porosity in the range of 55 to 70%.

The TWC catalytic material may be formed from a single washcoat composition that permeates an inlet side, an outlet side, or both of the particulate filter.

A first single washcoat layer may be present on the inlet side along up to about 0-100% of the axial length of the particulate filter from the upstream end and a second single washcoat layer may be present on the outlet side along up to about 0-100% of the axial length of the particulate filter from the downstream end, wherein at least one of the first and single washcoat layers is present in an amount of >0%.

A first single washcoat layer may be present on the inlet side along up to about 50-100% of the axial length of the particulate filter from the upstream end and a second single washcoat layer may be present on the outlet side along up to about 50-100% of the axial length of the particulate filter from the downstream end. The first single washcoat layer may be present on the inlet side along up to about 50-55% of the axial length of the particulate filter from the upstream end and the second single washcoat layer is present on the outlet side along up to about 50-55% of the axial length of the particulate filter from the downstream end.

A single washcoat layer may be present on the inlet side along up to about 100% of the axial length of the particulate filter from the upstream end and there is not a washcoat layer on the outlet side.

A single washcoat layer may be present on the outlet side along up to about 100% of the axial length of the particulate filter from the downstream end and there is not a washcoat layer on the inlet side.

The TWC catalytic material may be present in an amount in the range of about 1 to about 5 g/in$^3$ (about 60 to about 300 g/L).

The uncoated porosity may be in the range of 55 to 70%.

The TWC catalytic material may comprise rhodium, palladium, ceria or a ceria composite, and alumina. The particulate filter comprises cordierite, alumina, silicon carbide, aluminum titanate, or mullite.

Another aspect provides a catalyzed particulate filter located in an emission treatment system downstream of a gasoline direct injection engine for treatment of an exhaust stream comprising hydrocarbons, carbon monoxide, nitrogen oxides, and particulates, the catalyzed particulate filter comprising:
- a particulate filter comprising a wall thickness in the range of about 6 mils (152 μm) to about 14 mils (356 μm) and a porosity in the range of 55 to 70%; and
- a three-way conversion (TWC) catalytic material in an amount in the range of about 1.0 to about 4 g/in$^3$ (120 to 244 g/L);
- wherein the TWC catalytic material permeates walls of the particulate filter. In one or more embodiments, there is no layering of the catalytic material on the surface of the walls of the particulate filter except optionally in areas of overlapped washcoat. In one or more further embodiments, there is no catalytic material outside of pores of the walls of the particulate filter.

Another aspect is a method of treating an exhaust gas comprising hydrocarbons, carbon monoxide, nitrogen oxides, and particulates, the method comprising: obtaining a catalyzed particulate filter according to any embodiment disclosed herein and locating the catalyzed particulate filter downstream of a gasoline direct injection engine; wherein upon operation of the engine, exhaust gas from the gasoline direct injection engine contacts the catalyzed particulate filter.

A further aspect is a method of making a catalyzed particulate filter, the method comprising: obtaining a particulate filter; forming a slurry of a three-way conversion (TWC) catalytic material having a pH in the range of 2 to 7; and permeating the TWC catalytic material into wall of the particulate filter to form the catalyzed particulate filter such that the catalyzed particulate filter has a coated porosity that is less than an uncoated porosity of the particulate filter. The slurry may have a dynamic viscosity in the range of about 5 to less than 40 mPa·s at 20° C. and solids content of 0-25 wt.-% solids. The pH may be in the range of 3 to 5. In one or more embodiments, there is no layering of the catalytic material on the surface of the walls of the particulate filter except optionally in areas of overlapped washcoat. In a detailed embodiment, there is no catalytic material outside pores of the walls of the particulate filter. The coated porosity may be linearly proportional to a washcoat loading of the TWC catalytic material. The coated porosity may be between 75 and 98% of the uncoated porosity, or even 80 and 95% of the uncoated porosity, or even between 80 and less than 93%. A coated backpressure of the catalyzed particulate filter is generally non-detrimental to performance of the engine. For a washcoat loading of 60 g/L, the catalyzed particulate filter may have a coated backpressure of that is less than or equal to a 15%±3% increase compared to an uncoated backpressure. In a detailed embodiment, the particulate filter may comprise 200-300 cells per square inch (CPSI) and a wall thickness in the range of 6-14 mil, the catalyzed particulate filter having a coated backpressure of that is less than or equal to a 50% increase compared to an uncoated backpressure.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1A:
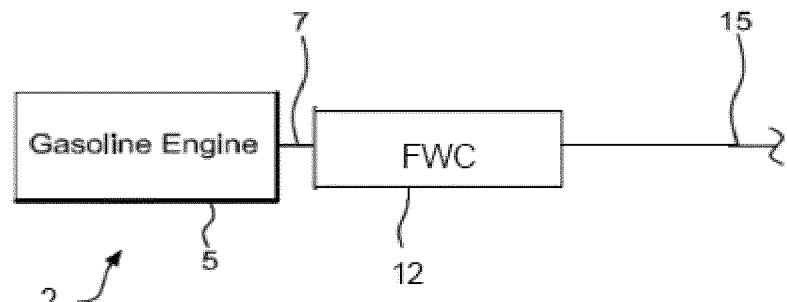
FIG. 1 is a schematic view showing an engine emission treatment system according to a detailed embodiment.

Provided are filters for gasoline direct injection engines (GDI) that are designed to achieve high particle filtration efficiency and gaseous emissions conversion while having the lowest possible backpressure. A typical TWC washcoat loading on a flow-through substrate is in the range of about 2 and 5 g/in$^3$ (about 120 and about 300 g/L), although loadings of about of 1 g/in$^3$ (about 60 g/L) may be used in some applications. A typical TWC washcoat may comprise about 45 wt.-% oxygen storage components (OSC). Washcoat loadings in the range of 2 and 5 g/in$^3$ (about 120 and about 300 g/L) are typically applied in two or three coating steps on flow-through substrates. In order to be successfully applied in a gasoline applications, an effective particulate filter, which may be referred to as a four-way conversion (FWC) catalyst, should: have a similar amount of TWC washcoat to resist the high temperature stresses during the operation, include OSC materials to ensure gaseous emission conversions during rich and lean phases: limit the backpressure increase thus minimizing the engine power losses, and be applied in the lowest amount of coating steps.

Disclosed herein is a coating process that leads to a reduction of number of coating steps for the manufacture of FWC catalysts enabling a reduction of backpressure at constant washcoat loading. FWC with further reduced backpressure are obtained by optimization of the slurry viscosity. In fact, the ceramic wall-flow substrates used for the preparation of FWC catalysts are generally high-porous systems (e. g., 55-70% porosity), which strongly affects their coatability and interaction with the slurry. In particular, using a low viscous slurry, e. g., a dynamic viscosity in the range of about 5 to less than 40 mPa·s at 20° C., it is possible to achieve a homogenous washcoat distribution along the filter length while a higher viscosity slurry, e. g., 40 mPa·s at 20° C. or greater, tends to lead to washcoat accumulation on the substrate surface. A low viscosity slurry is obtained by minimization of the slurry ionic strength with an opportune choice of precious metal precursors and promoters for pH adjustment of the slurry before coating. Besides backpressure reduction, low viscous slurry allows for higher degree of freedom for the coating of FWC catalysts. Due to higher washcoat homogeneity in the filter substrate, FWC catalysts bearing several different washcoat profiles can be realized thus giving the opportunity to further optimize the gaseous emission performance of such catalysts.

Wall-flow filter designs impact backpressure in an exhaust system. Wall-flow filters are typically characterized by mean pore diameter, pore size distribution, porosity, cells per square inch (cpsi), and wall thickness. As wall thickness decreases, backpressure decreases but mechanical strength is lowered. U.S. Patent Applications. No. 2009/0049815 discloses a thin-walled porous ceramic wall-flow filters for diesel exhaust filtration.

Historically, in the context of diesel particulate filters, it was thought that relatively small pores and/or smaller porosity would capture particulate matter. For FWC, however, despite due to the nature of the particulates being finer than those in diesel engines, filters for diesel particulates are inadequate because such filters generally cannot accommodate sufficient catalyst loading to meet HC, NOx, and CO conversion requirements.

The inventive catalyzed particulate filters disclosed herein provide excellent backpressure, porosity, and homogeneity characteristics. That is, even with a high applied washcoat amount, backpressure increase stays low, as demonstrated by backpressure measurements. In addition, catalytic mass is well distributed in the pore network and no layer is formed on the filter walls, as demonstrated by Scanning Electron Microscope (SEM) micrographs. Also, the pores of the porous filter substrate will be filled homogeneously. The porosity of the coated catalyst is reduced linearly (step-by-step) as more catalytic mass is be applied as no layer is formed on the walls of the filter and the whole catalytic mass is applied in the pore network, as demonstrated by mercury porosimetry.

The following definitions are used herein.

As used herein, the term "permeate" when used to describe the dispersion of the TWC catalyst into porous walls of a particulate filter means that the particular composition penetrates into at least a majority of the hollow regions within the wall thickness, and becomes deposited on the internal surfaces throughout the thickness of the walls. In this manner the material becomes dispersed throughout the walls of the filter.

Porosity of the particulate filters is a percentage of the volume of pores of the filter relative to the volume of the filter. One way to measure porosity is by mercury porosimetry. A filter may be sectioned, and porosity of each section is measured, and the results are averaged. For example, a filter can be sectioned into a front/inlet piece, a middle piece, and a rear/outlet piece, the porosity of each piece can be taken, and the results can be averaged. An uncoated porosity is the porosity of the filter, which does not have any catalytic material applied to it. A coated porosity is the porosity of a catalyzed filter, which is the combination of catalytic material and a filter. Inventive catalyzed particulate filters have a coated porosity that is less than an uncoated porosity of the particulate filter, which indicates that the washcoat resides in the pores of the filter and not on the surface of the walls. The methods used herein result in a coated porosity that is linearly proportional to a washcoat loading of the TWC catalytic material because the material resides in the pores and not on the walls of the filter. The coated porosity may be between 75 and 98%, or 80 and 95%, or even 80 and 93% of the uncoated porosity.

Backpressure of the filters is a measure of resistance of flow through the filter, expressed in, for example, units of mbar. An uncoated backpressure is the backpressure of the filter, which does not have any catalytic material applied to it. A coated backpressure is the backpressure of a catalyzed filter, which is the combination of catalytic material and a filter. Inventive catalyzed particulate filters have a coated backpressure that is non-detrimental to the performance of the engine. A non-detrimental pressure drop means that the engine will perform generally the same (e.g., fuel consumption) in a wide range of engine operational modes in the presence of a filter substrate that is either in a coated or an uncoated state.

"FWC" refers to four-way conversion where in addition to three-way conversion (TWC) functionality, which is defined next, there is a filtering function.

"TWC" refers to the function of three-way conversion where hydrocarbons, carbon monoxide, and nitrogen oxides are substantially simultaneously converted. A gasoline engine typically operates under near stoichiometric reaction conditions that oscillate or are pertubated slightly between fuel rich and fuel lean air to fuel ratios (A/F ratios) ($\lambda=1\pm\sim0.01$), at perturbation frequencies of 0.5 to 2 Hz. Use of "stoichiometric" herein refers to the conditions of a gasoline engine, accounting for the oscillations or pertubations of A/F ratios near stoichiometric. TWC catalysts include oxygen storage components (OSCs) such as ceria that have multi-valent states which allows oxygen to be held and released under varying air to fuel ratios. Under rich conditions when NOx is being reduced, the OSC provides a small amount of oxygen to consume unreacted CO and HC. Likewise, under lean conditions when CO and HC are being oxidized, the OSC reacts with excess oxygen and/or NOx. As a result, even in the presence of an atmosphere that oscillates between fuel rich and fuel lean air to fuel ratios, there is conversion of HC, CO, and NOx all at the same (or at essentially all the same) time. Typically, a TWC catalyst comprises one or more platinum group metals (PGM) such as palladium and/or rhodium and optionally platinum; an oxygen storage component; and optionally promoters and/or stabilizers. Under rich conditions, TWC catalysts can generate ammonia. An exemplary TWC catalyst comprises gamma alumina in an amount in the range of 20-60%; a ceria-zirconia composite in an amount in the range of 20-50%; one or more of promotors and/or stabilizers of lanthana, baria, zirconia, and strontium in an amount of up to 10%; and one or more PGMs, whose amounts are application-specific, in an amount, for example, of 2 $g/ft^3$-50 $g/ft^3$.

Reference to "full TWC functionality" means that HC and CO oxidation and NOx reduction can be achieved in accordance with requirements of regulatory agencies and/or car manufacturers. In this way, platinum group metal components such as platinum, palladium, and rhodium are provided to achieve HC, CO, and NOx conversions and sufficient oxygen storage components (OSC) are provided to achieve sufficient oxygen storage capacity to ensure proper HC, NOx, and CO conversion in an environment of varying A/F (air-to-fuel) ratios. Sufficient oxygen storage capacity generally means that after a full useful life aging as defined by a car manufacturer, the catalyst can store and release a minimum amount of oxygen. In one example, a useful oxygen storage capacity can be 100 mg per liter of oxygen. For another example, a sufficient oxygen storage capacity can be 200 mg per liter of oxygen after 80 hours of exothermic aging at 1050° C. Sufficient oxygen storage capacity is needed to ensure that on-board diagnostics (OBD) systems detect a functioning catalyst. In the absence of sufficient oxygen storage capacity, the OBD will trigger an alarm of a non-functioning catalyst. High oxygen storage capacity is more than the sufficient amount, which widens the operating window of the catalyst and permits more flexibility in engine management to a car manufacturer.

Reference to oxygen storage component (OSC) refers to an entity that has multi-valence state and can actively react with oxidants such as oxygen or nitrogen oxides under oxidative conditions, or reacts with reductants such as carbon monoxide (CO) or hydrogen under reduction conditions. Examples of suitable oxygen storage components include ceria. Praseodymia can also be included as an OSC. Delivery of an OSC to the washcoat layer can be achieved by the use of, for example, mixed oxides. For example, ceria can be delivered by a mixed oxide of cerium and zirconium, and/or a mixed oxide of cerium, zirconium, and neodymium. For example, praseodymia can be delivered by a mixed oxide of praseodymium and zirconium, and/or a mixed oxide of praseodymium, cerium, lanthanum, yttrium, zirconium, and neodymium.

TWC catalysts that exhibit good activity and long life comprise one or more platinum group metals (e. g., platinum, palladium, rhodium, rhenium and iridium) disposed on a high surface area, refractory metal oxide support, e. g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material. The refractory metal oxide supports may be stabilized against thermal degradation by materials such as zirconia, titania, alkaline earth metal oxides such as baria, calcia or strontia or, most usually, rare earth metal oxides, for example, ceria, lanthana and mixtures of two or more rare earth metal oxides. For example, see U.S. Pat. No. 4,171,288 (Keith). TWC catalysts can also be formulated to include an oxygen storage component.

Reference to a "support" in a catalyst washcoat layer refers to a material that receives precious metals, stabilizers, promoters, binders, and the like through association, dispersion, impregnation, or other suitable methods. Examples of supports include, but are not limited to, high surface area refractory metal oxides and composites containing oxygen storage components. High surface refractory metal oxide supports refer to support particles having pores larger than 20 Å and a wide pore distribution. High surface area refractory metal oxide supports, e.g., alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption.

One or more embodiments include a high surface area refractory metal oxide support comprising an activated compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. Examples of composites containing oxygen storage components include, but are not limited to, ceria-zirconia and ceria-zirconia-lanthana. Reference to a "ceria-zirconia composite" means a composite comprising ceria and zirconia, without specifying the amount of either component. Suitable ceria-zirconia composites include, but are not limited to, composites having, for example, 5%, 10%, 15%, 20%, 25%, 30%, 35%, 40%, 45%, 50%, 55%, 60%, 65%, 70%, 75%, 80%, 85%, 90% or even 95% of ceria content. Certain embodiments provide that the support comprises bulk ceria having a nominal ceria content of 100% (i. e., >99% purity).

Before describing several exemplary embodiments of the invention, it is to be understood that the invention is not limited to the details of construction or process steps set forth in the following description. The invention is capable of other embodiments and of being practiced or being carried out in various ways.

Figure 1B:
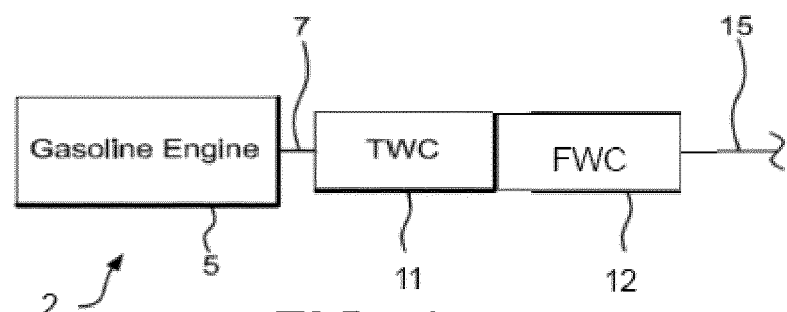

Turning to FIG. 1A, an emissions treatment system 2 comprises a gasoline engine 5 that conveys exhaust through line 7 to a FWC catalyst 12, which is in a close-coupled (CC) position. Line 15 out of the FWC catalyst can lead to further treatment components and/or to the tail pipe and out of the system. The FWC catalyst 12 contains a TWC catalyst loading to provide full TWC functionality, thereby meeting emission requirements. The FWC in FIG. 1A may be contain high washcoat loadings, where overall washcoat loading is ≥1.5 $g/in^3$, for example: 1.5-3 $g/in^3$, or even 2.5 $g/in^3$. As shown in FIG. 1B, the emissions treatment system of FIG. 1A may optionally further include a TWC catalyst between the engine and the FWC catalyst (in a first CC position, CC1), in which case the TWC catalyst loading that is designed to work in conjunction with the FWC catalyst (in a second CC position, CC2) in order to collectively provide full TWC functionality, thereby meeting emission requirements. Again, the FWC in FIG. 1B may be contain high washcoat loadings, where overall washcoat loading is ≥1.5 $g/in^3$, for example: 1.5-3 $g/in^3$, or even 2.5 $g/in^3$.

Figure 1C:
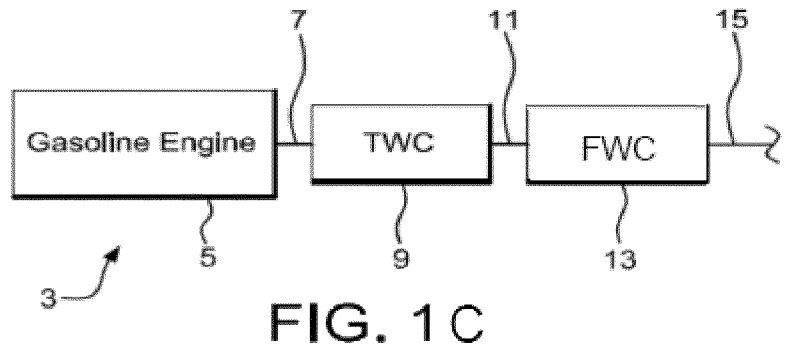

Turning to FIG. 1C, an emissions treatment system 3 comprises a gasoline engine 5 that conveys exhaust through line 7 to a first TWC catalyst 9, which is in a close-coupled (CC) position. A downstream TWC-coated particulate filter 13, which receives the exhaust stream through line 11, is in an underfloor (UF) position. Line 15 can lead to further treatment components and/or to the tail pipe and out of the system. The TWC-coated particulate filter (FWC) 13 contains a TWC catalyst loading that is designed to work in conjunction with the CC TWC catalyst in order to collectively provide full TWC functionality, thereby meeting emission requirements. The FWC in FIG. 1C may contain a low washcoat loading, where overall washcoat loading is <1.5 g/in³, for example: 0.25-<1.5 g/in³, or even 0.5-1.0 g/in³.

Particulate Filter

Reference to particulate filter means a substrate so sized and configured to trap particulates generated by the combustion reactions in the direct injection gasoline engine. Trapping of particulates can occur, for example, by use of a particulate (or soot) filter, by use of a flow-through substrate having an internal tortuous path such that a change in direction of flow of the particulates causes them to drop out of the exhaust stream, by use of a metallic substrate, such as a corrugated metal carrier, or by other methods known to those skilled in the art. Other filtration devices may be suitable, such as a pipe with a roughened surface that can knock particles out of the exhaust stream. A pipe with a bend may also be suitable.

Figure 2:
FIG. 2 is a perspective view of a wall flow filter substrate.

With reference to filters, FIG. 2 depicts a perspective view of an exemplary wall flow filter substrate suitable for a particulate filter. Wall flow substrates useful for supporting the TWC or oxidation catalyst compositions have a plurality of fine, substantially parallel gas flow passages extending along the longitudinal axis (or axial length) of the substrate. Typically, each passage is blocked at one end of the substrate body, with alternate passages blocked at opposite end-faces. Such monolithic carriers may contain up to about 300 flow passages (or "cells") per square inch of cross section, although far fewer may be used. For example, the carrier may have from about 7 to 300, more usually from about 200 to 300, cells per square inch ("cpsi"). The cells can have cross sections that are rectangular, square, circular, oval, triangular, hexagonal, or are of other polygonal shapes. Wall flow substrates for FWC typically have a wall thickness between 0.004 and 0.012 inches (4-12 mils or 102-306 μm). Axial zoning may be desirable such that a coating is provided along an axial length of the filter. On the inlet side, as measured from the upstream end 54, a coating may extend up to 50% of the axial length (e. g., 1 to 49.9%, or 10 to 45%), 50 to 75% of the axial length, or even 100% of the axial length. On the outlet side, as measured from the downstream end 56, a coating may extend up to 50% of the axial length (e. g., 1 to 49.9%, or 10 to 45%), 50 to 75% of the axial length, or even 100% of the axial length.

Figure 3:
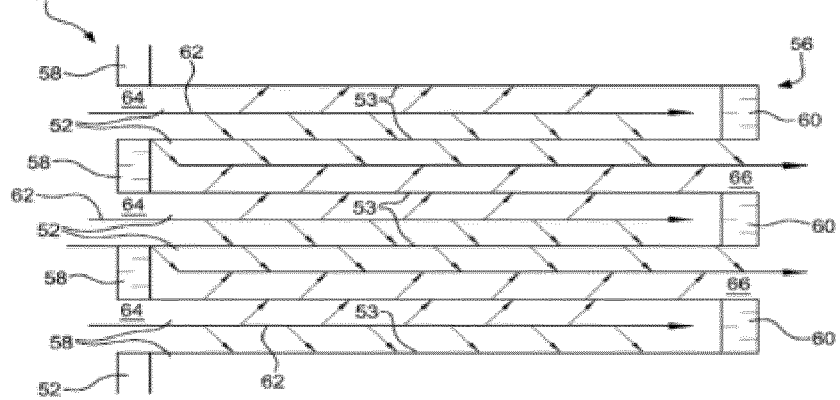
FIG. 3 is a cut-away view of a section of a wall flow filter substrate.

FIGS. 2 and 3 illustrate a wall flow filter substrate 50 that has a plurality of passages 52. The passages are tubularly enclosed by the internal walls 53 of the filter substrate. The substrate has an inlet or upstream end 54 and an outlet or downstream end 56. Alternate passages are plugged at the inlet end with inlet plugs 58 and at the outlet end with outlet plugs 60 to form opposing checkerboard patterns at the inlet 54 and outlet 56. A gas stream 62 enters at upstream end 54 through the unplugged channel inlet 64, is stopped by outlet plug 60 and diffuses through channel walls 53 (which are porous) to the outlet side 66. A coating on the inlet side of the filter means that the coating resides on or within the walls 53 such that the gas stream 62 contacts the inlet coating first. A coating on the outlet side of the filter means that the coating resides on or within the walls 53 such that the gas stream 62 contacts the outlet coating after the inlet coating. The gas cannot pass back to the inlet side of walls because of inlet plugs 58.

Figure 4:
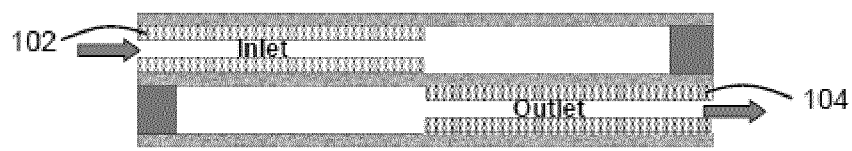
FIGS. 4-6 provide schematic views of FWC coating designs.
Figure 5:
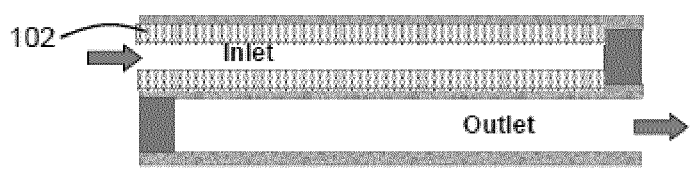
Figure 6:
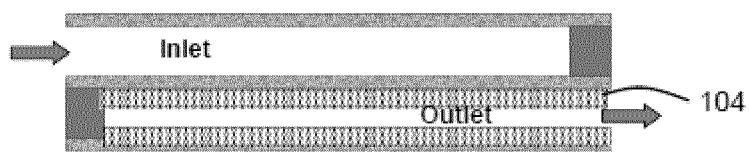

In FIG. 4, a first washcoat 102 is provided 50-55% of the length of the inlet side and a second washcoat 104 is provided 50-55% of the length of the outlet side. The embodiment of FIG. 4 may be suitable for high washcoat loadings, where overall washcoat loading is ≥1.5 g/in³, for example: 1.5-3 g/in³, or even 2.5 g/in³. In FIG. 5, a single washcoat 102 is provided up to 100% of the length of the inlet side, which includes >0% and all values in between, and there is not a washcoat provided on the outlet side. The embodiment of FIG. 5 may be suitable for low washcoat loadings, where overall washcoat loading is <1.5 g/in³, for example: 0.25-<1.5 g/in³, or even 0.5-1.0 g/in³. In FIG. 6, a single washcoat 104 is provided up to 100% of the length of the outlet side, which includes >0% to 100% and all values in between, and there is not a washcoat provided on the inlet side. The embodiment of FIG. 6 may also be suitable for low washcoat loadings, where overall washcoat loading is <1.5 g/in³, for example: 0.25-<1.5 g/in³, or even 0.5-1.0 g/in³. In FIGS. 4-6, the washcoats permeate the walls.

Wall flow filter substrates can be composed of ceramic-like materials such as cordierite, alumina, silicon carbide, aluminum titanate, mullite, or of refractory metal. Wall flow substrates may also be formed of ceramic fiber composite materials. Specific wall flow substrates are formed from cordierite, silicon carbide, and aluminum titanate. Such materials are able to withstand the environment, particularly high temperatures, encountered in treating the exhaust streams.

Wall flow substrates for use in the inventive system can include thin porous walled honeycombs (monoliths) through which the fluid stream passes without causing too great an increase in back pressure or pressure across the article. Ceramic wall flow substrates used in the system can be formed of a material having a porosity (also referred to as uncoated porosity) of at least 40% (e. g., from 40 to 70% or even 55 to 70%). Useful wall flow substrates can have an mean pore size of 10 or more microns, preferably 13 to 25 microns. When substrates with these porosities and these mean pore sizes are coated with the techniques described below, adequate levels of TWC compositions can be loaded onto the substrates to achieve excellent hydrocarbon, CO, and/or NOx conversion efficiency. These substrates are still able retain adequate exhaust flow characteristics, i.e., acceptable back pressures, despite the catalyst loading.

The porous wall flow filter used in this invention is catalyzed in that the wall of the element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more washcoats of catalytic materials and combinations of one or more washcoats of catalytic materials on the inlet and/or outlet walls of the element.

With reference to a metallic substrate, a useful substrate may be composed of one or more metals or metal alloys. The metallic carriers may be employed in various shapes such as corrugated sheet or monolithic form. Specific metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e. g., 10-25 wt % of chromium, 3-8 wt % of aluminum and up to 20 wt % of nickel. The alloys may also contain small or trace amounts of one or more other metals such as manganese, copper, vanadium, titanium and the like. The surface of the metal carriers may be oxidized at high temperatures, e. g., 1000° C. and higher, to improve the resistance to corrosion of the alloys by forming an oxide layer on the surfaces of the carriers. Such high temperature-induced oxidation may enhance adherence of a catalytic material to the carrier.

Coating Wall Flow Filters

To coat wall flow filters with the TWC or oxidation catalyst composition using a traditional technique, a mixture of ingredients is prepared using metal salts, which are usually a mixture of organic and inorganic salts, to form a catalyst slurry. Such slurries may typically have a dynamic viscosity of 14 to 400 mPa·s at 20° C. or greater with a solids content in the range of 25% to 0% of solids. Substrates are immersed vertically in a portion of the catalyst slurry such that the top of the substrate is located just above the surface of the slurry. In this manner, slurry contacts the inlet face of each honeycomb wall, but is prevented from contacting the outlet face of each wall. The sample is left in the slurry for about 30-60 seconds. The filter is removed from the slurry, and excess slurry is removed from the wall flow filter first by allowing it to drain from the channels, then by blowing with compressed air (against the direction of slurry penetration). By using this traditional technique, the catalyst slurry permeates the walls of the filter, yet the pores are not occluded to the extent that undue back pressure will build up in the finished filter. By using this traditional technique, the coated porosity of the filter is expected to be substantially the same as its uncoated porosity. The coated filters are dried typically at about 100° C. and calcined at a higher temperature (e. g., 300 to 450° C. and up to 590° C.). After calcining, the catalyst loading can be determined through calculation of the coated and uncoated weights of the filter. As will be apparent to those of skill in the art, the catalyst, loading can be modified by altering the solids content of the coating slurry. Alternatively, repeated immersions of the filter in the coating slurry can be conducted, followed by removal of the excess slurry as described above.

To coat wall flow filters with the TWC or oxidation catalyst composition using the improved techniques of the present invention, a mixture of ingredients is prepared using inorganic metal salts only to form a catalyst slurry that has a low viscosity relative to the traditional technique. Such slurries may typically have a dynamic viscosity in the range of ~5 to less than 40 mPa·s at 20° C., or even ~5 to less than 30 mPa·s, with a solids content in the range of 25% to 0%. The slurry viscosity is much lower than the traditional technique by at least 50% or even more such as 75-90%. The number of processing steps is reduced compared to the traditional technique. Substrates are immersed vertically in a portion of the catalyst slurry for the length of the substrate equal to the targeted length of the coat to be applied. In this manner, slurry contacts the inlet face of each honeycomb wall and penetrates the wall completely for the length of immersion. The sample is left in the slurry for about 1-6 seconds. The filter is removed from the slurry, and excess slurry is removed from the wall flow filter first by allowing it to drain from the channels, then by blowing with compressed air (against the direction of slurry penetration). By using this improved technique, the catalyst slurry permeates the walls of the filter, yet the pores are not occluded to the extent that undue back pressure will build up in the finished filter. By using this improved technique, the coated porosity of the filter is expected to be lower than its uncoated porosity in that the washcoat resides in the pores of the filter and not on the surface of the walls. Furthermore, relative to the traditional technique, improved homogeneity of slurry distribution along the coated length is achieved due to more efficient penetration of the low viscous slurry into the walls. Finally, by using such technique and as a result of the improved slurry penetration into the wall and homogeneity, lower back pressure increase is achieved relative of the finished filter relative to the traditional technique described above. The coated filters are dried typically at about 100° C. and calcined at a higher temperature (e. g., 300 to 450° C. and up to 590° C.). After calcining, the catalyst loading can be determined through calculation of the coated and uncoated weights of the filter. As will be apparent to those of skill in the art, the catalyst, loading can be modified by altering the solids content of the coating slurry. Alternatively, repeated immersions of the filter in the coating slurry can be conducted, followed by removal of the excess slurry as described above.

Preparation of Catalyst Composite Washcoats

The catalyst composites may be formed in a single layer or multiple layers. In some instances, it may be suitable to prepare one slurry of catalytic material and use this slurry to form multiple layers on the carrier. The composites can readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage there through of the gas stream being treated. A "washcoat layer," therefore, is defined as a coating that is comprised of support particles. A "catalyzed washcoat layer" is a coating comprised of support particles impregnated with catalytic components.

The catalyst composite can be readily prepared in layers on a carrier. For a first layer of a specific washcoat, finely divided particles of a high surface area refractory metal oxide such as gamma alumina are slurried in an appropriate vehicle, e.g., water. To incorporate components such as precious metals (e.g., palladium, rhodium, platinum, and/or combinations of the same), stabilizers and/or promoters, such components may be incorporated in the slurry as a mixture of water soluble or water-dispersible compounds or complexes. Typically, when palladium is desired, the palladium component is utilized in the form of a compound or complex to achieve dispersion of the component on the refractory metal oxide support, e.g., activated alumina. The term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or rhodium nitrate.

A suitable method of preparing any layer of the layered catalyst composite of the invention is to prepare a mixture of a solution of a desired precious metal compound (e.g., palladium compound) and at least one support, such as a finely divided, high surface area, refractory metal oxide support, e.g., gamma alumina, which is sufficiently dry to absorb substantially all of the solution to form a wet solid which later combined with water to form a coatable slurry. In one or more embodiments, the slurry is acidic, having, for example, a pH of about 2 to less than about 7, or preferably in the range of 3-5. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e. g., barium acetate, and a promoter, e.g., lanthanum nitrate, may be added to the slurry.

In one embodiment, the slurry is thereafter comminuted to result in substantially all of the solids having particle sizes of less than about 30 microns, i.e., between about 0.1-15 microns, in an average diameter. An exemplary $d_{90}$ average particle diameter is in the range of about 2.5 to about 8 µm. The comminution may be accomplished in a ball mill, circular mill, or other similar equipment, and the solids content of the slurry may be, e. g., about 20-60 wt. %, more particularly about 30-40 wt. %.

Additional layers, i. e., the second and third layers may be prepared and deposited upon the first layer in the same manner as described above for deposition of the first layer upon the carrier.

EMBODIMENTS

Various embodiments are listed below. It will be understood that the embodiments listed below may be combined with all aspects and other embodiments in accordance with the scope of the invention.

Embodiment 1

An emission treatment system downstream of a gasoline direct injection engine for treatment of an exhaust stream comprising hydrocarbons, carbon monoxide, nitrogen oxides, and particulates, the emission treatment system comprising a catalyzed particulate filter comprising:
a three-way conversion (TWC) catalytic material that permeates walls of a particulate filter;
wherein the catalyzed particulate filter has a coated porosity that is less than an uncoated porosity of the particulate filter.

Embodiment 2

The emission treatment system of embodiment 1, wherein there is no layering of the catalytic material on the surface of the walls of the particulate filter except optionally in areas of overlapped washcoat.

Embodiment 3

The emission treatment system of embodiment 1 or 2, wherein the coated porosity is linearly proportional to a washcoat loading of the TWC catalytic material.

Embodiment 4

The emission treatment system of any of embodiments 1-3, wherein the coated porosity is between 75 and 98% of the uncoated porosity.

Embodiment 5

The emission treatment system of embodiment 4, wherein the coated porosity is between 80 and 95% of the uncoated porosity.

Embodiment 6

The emission treatment system of any of embodiments 1-5, wherein a coated backpressure of the catalyzed particulate filter is non-detrimental to performance of the engine.

Embodiment 7

The emission treatment system of any of embodiments 1-6, wherein for a washcoat loading of up to about 60 g/L, the catalyzed particulate filter has a coated backpressure of that is less than or equal to a 15%±3% increase compared to an uncoated backpressure.

Embodiment 8

The emission treatment system of any of embodiments 1-7, wherein the particulate filter comprises 200-300 cells per square inch (CPSI) and a wall thickness in the range of 6-14 mil, the catalyzed particulate filter has a coated backpressure of that is less than or equal to a 50% increase compared to an uncoated backpressure.

Embodiment 9

The emission treatment system of any of embodiments 1-8, wherein the particulate filter comprises a mean pore diameter in the range of about 13 to about 25 µm.

Embodiment 10

The emission treatment system of any of embodiments 1-9, wherein the particulate filter comprises a wall thickness in the range of about 6 mils (152 µm) to about 14 mils (356 µm) and an uncoated porosity in the range of 55 to 70%.

Embodiment 11

The emission treatment system of any of embodiments 1-10, wherein the TWC catalytic material is formed from a single washcoat composition that permeates an inlet side, an outlet side, or both of the particulate filter.

Embodiment 12

The emissions treatment system of embodiment 11, wherein a first single washcoat layer is present on the inlet side along up to about 0-100% of the axial length of the particulate filter from the upstream end and a second single washcoat layer is present on the outlet side along up to about 0-100% of the axial length of the particulate filter from the downstream end, wherein at least one of the first and single washcoat layers is present in an amount of >0%.

Embodiment 13

The emissions treatment system of embodiment 12, wherein a first single washcoat layer is present on the inlet side along up to about 50-100% of the axial length of the particulate filter from the upstream end and a second single washcoat layer is present on the outlet side along up to about 50-100% of the axial length of the particulate filter from the downstream end.

Embodiment 14

The emissions treatment system of embodiment 13, wherein the first single washcoat layer is present on the inlet side along up to about 50-55% of the axial length of the particulate filter from the upstream end and the second single washcoat layer is present on the outlet side along up to about 50-55% of the axial length of the particulate filter from the downstream end.

Embodiment 15

The emissions treatment system of embodiment 11, wherein a single washcoat layer is present on the inlet side along up to about 100% of the axial length of the particulate filter from the upstream end and there is not a washcoat layer on the outlet side.

Embodiment 16

The emissions treatment system of embodiment 11, wherein a single washcoat layer is present on the outlet side along up to about 100% of the axial length of the particulate filter from the downstream end and there is not a washcoat layer on the inlet side.

Embodiment 17

The emission treatment system of any of embodiments 1-16 comprising the TWC catalytic material in an amount in the range of about 1 to about 5 g/in$^3$ (about 60 to about 300 g/L).

Embodiment 18

The emission treatment system of any of embodiments 1-17, wherein the uncoated porosity is in the range of 55 to 70%.

Embodiment 18.5

The emission treatment system of any of embodiments 1-18, wherein the uncoated porosity is a percentage of volume of pores of the particulate filter relative to volume of the particulate filter.

Embodiment 19

The emission treatment system of any of embodiments 1-18.5, wherein the TWC catalytic material comprises rhodium, palladium, ceria or a ceria composite, and alumina.

Embodiment 20

The emission treatment system of any of embodiments 1-19, wherein the particulate filter comprises cordierite, alumina, silicon carbide, aluminum titanate, or mullite.

Embodiment 21

A catalyzed particulate filter located in an emission treatment system downstream of a gasoline direct injection engine for treatment of an exhaust stream comprising hydrocarbons, carbon monoxide, nitrogen oxides, and particulates, the catalyzed particulate filter comprising:
  a particulate filter comprising a wall thickness in the range of about 6 mils (152 µm) to about 14 mils (356 µm) and a porosity in the range of 55 to 70%; and
  a three-way conversion (TWC) catalytic material in an amount in the range of about 1.0 to about 4 g/in$^3$ (120 to 244 g/L);
  wherein the TWC catalytic material permeates walls of the particulate filter.

Embodiment 21.1

The catalyzed particulate filter of embodiment 21, wherein there is no layering of the catalytic material on the surface of the walls of the particulate filter except optionally in areas of overlapped washcoat.

Embodiment 21.3

The catalyzed particulate filter of embodiment 21 or 21.1, wherein there is no catalytic material outside of pores of the walls of the particulate filter.

Embodiment 21.5

The catalyzed particulate filter of any of embodiments 21-21.3, wherein the porosity is a percentage of volume of pores of the particulate filter relative to volume of the particulate filter.

Embodiment 22

A method of treating an exhaust gas comprising hydrocarbons, carbon monoxide, nitrogen oxides, and particulates, the method comprising:
  obtaining a catalyzed particulate filter according to any of embodiments 1-21.5; and
  locating the catalyzed particulate filter downstream of a gasoline direct injection engine;
  wherein upon operation of the engine, exhaust gas from the gasoline direct injection engine contacts the catalyzed particulate filter.

Embodiment 23

A method of making a catalyzed particulate filter, the method comprising:
  obtaining a particulate filter;
  forming a slurry of a three-way conversion (TWC) catalytic material having a pH in the range of 2 to 7; and
  permeating the TWC catalytic material into wall of the particulate filter to form the catalyzed particulate filter such that the catalyzed particulate filter has a coated porosity that is less than an uncoated porosity of the particulate filter.

Embodiment 24

The method of embodiment 23, wherein the slurry has a dynamic viscosity in the range of about 5 to less than 40 mPa·s at 20° C. and solids content of 0-25 wt.-% solids.

Embodiment 25

The method of any of embodiments 23-24, wherein the pH is in the range of 3 to 5.

Embodiment 26

The method of any of embodiments 23-25, wherein there is no layering of the catalytic material on the surface of the walls of the particulate filter except optionally in areas of overlapped washcoat.

Embodiment 26.5

The method of any of embodiments 23-26, wherein there is no catalytic material outside pores of the walls of the particulate filter.

Embodiment 27

The method of any of embodiments 23-26.5, wherein the coated porosity is linearly proportional to a washcoat loading of the TWC catalytic material.

Embodiment 28

The method of any of embodiments 23-27, wherein the coated porosity is between 75 and 98% of the uncoated porosity.

Embodiment 29

The method any of embodiments 23-28, wherein the coated porosity is between 80 and 95% of the uncoated porosity.

Embodiment 30

The method of any of embodiments 23-29, wherein a coated backpressure of the catalyzed particulate filter is non-detrimental to performance of the engine.

Embodiment 31

The method of any of embodiments 23-30, wherein for a washcoat loading of 60 g/L, the catalyzed particulate filter has a coated backpressure of that is less than or equal to a 15%±3% increase compared to an uncoated backpressure.

Embodiment 32

The method of any of embodiments 23-31, wherein the particulate filter comprises 200-300 cells per square inch (CPSI) and a wall thickness in the range of 6-14 mil, the catalyzed particulate filter has a coated backpressure of that is less than or equal to a 50% increase compared to an uncoated backpressure.

Embodiment 32.5

The method of any of embodiments 23-31, wherein uncoated porosity is a percentage of volume of pores of the particulate filter relative to volume of the particulate filter.

EXAMPLES

The following non-limiting examples shall serve to illustrate the various embodiments of the present invention. In each of the examples, the carrier is a wall-flow cordierite. In each of the examples, the carrier is a wall-flow cordierite. In each of the examples, porosity is a percentage of volume of pores of the particulate filter relative to volume of the particulate filter.

Example 1

Comparative

A particle filter of having a three-way conversion (TWC) catalyst coated thereon was prepared at a washcoat loading of 2 g/in$^3$ (120 g/L) on a 300 cells per square inch (CPSI) and 12 mil walls filter substrate sized 4.66*5". The raw substrate had a total intrusion volume of 0.82 mL/g and a mean pore diameter of 19.9 μm.

The method for coating the TWC catalyst washcoat onto the substrate was generally according to the traditional technique discussed above. The specific steps were as follows.

(1) Impregnate a high surface area gamma alumina with a solution of rhodium nitrate ($Rh(NO_3)_3$). Calcine the Rh-impregnated alumina. Add promotor precursors: barium hydroxide ($Ba(OH)_2$) and zirconium nitrate ($Zr(NO_3)_4$).

(2) Impregnate an oxygen storage component (OSC) with a solution of palladium ($Pd(NO_3)_2$) nitrate. Calcine the Pd-impregnated alumina. Add promotor precursor: barium acetate ($Ba(OAc)_2$). Mill the resulting material.

(3) Combine the materials of (1) and (2). Mill to form the final slurry/washcoat.

(4) Coat the substrate with the final slurry/washcoat.

For the preparation of Comparative Example 1, the processing (immersion) time was 40 seconds per side for a total of 80 seconds. Due to the high number of free ions, the dynamic viscosity was high (e.g., ~40 mPa·s at 20° C.) and in-wall coating was not possible.

Figure 7A:
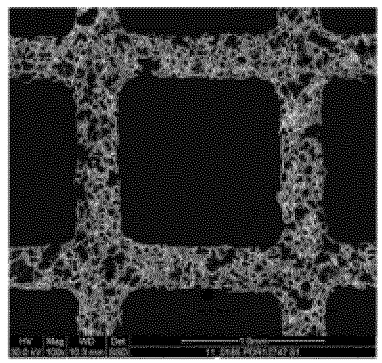
FIGS. 7A-C show SEM micrographs of inlet, middle, and outlet pieces of the catalyzed particulate filter of Comparative Example 1.
Figure 7B:
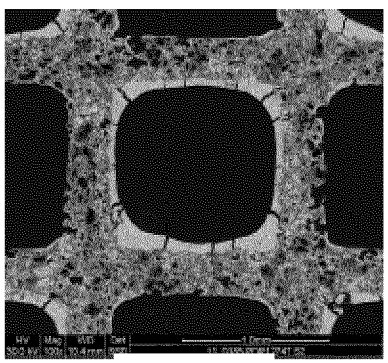
Figure 7C:
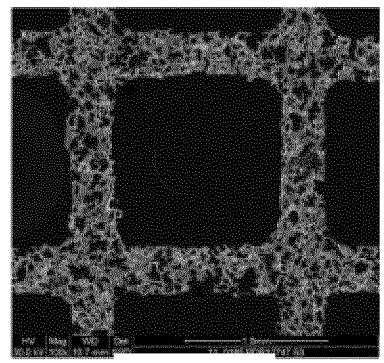

Comparative Example 1 coated nominally 50% of the washcoat on the inlet side and 50% on the outlet side, which allows for overlap of washcoat in the middle section of the filter. FIGS. 7A-C show SEM micrographs of inlet, middle, and outlet pieces of the catalyzed particulate filter of Comparative Example 1. The light areas show where there is washcoat. There is a significant amount of washcoat not in the pores of the walls in the middle section. The washcoat is not homogeneously distributed throughout the pores of the walls. In the middle section, the washcoat formed a layer on the surface of the walls.

Example 2

Comparative

A particle filter of having a three-way conversion (TWC) catalyst coated thereon was prepared at a washcoat loading of 2 g/in$^3$ (120 g/L) on a 300/8 filter substrate sized 4.66*5", whose characteristics are summarized in Table 1 below. The catalyst and method of coating was in accordance with Comparative Example 1.

Figure 8A:
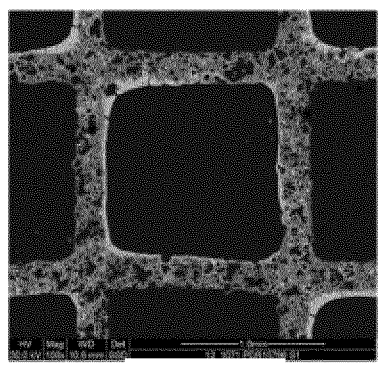
FIGS. 8A-C show SEM micrographs of inlet, middle, and outlet pieces of the catalyzed particulate filter of Comparative Example 2.
Figure 8B:
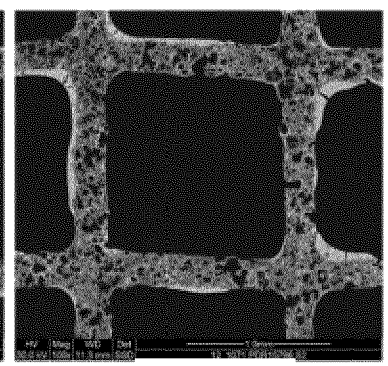
Figure 8C:
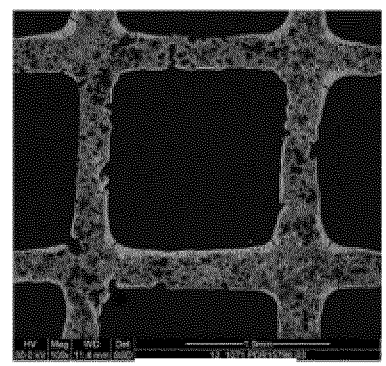

Comparative Example 2 coated nominally 50% of the washcoat on the inlet side and 50% on the outlet side, which allows for overlap of washcoat in the middle section of the filter. FIGS. 8A-C show SEM micrographs of inlet, middle, and outlet pieces of the catalyzed particulate filter of Comparative Example 2. The light areas show where there is washcoat. In the front, middle, and rear sections, there is a significant amount of washcoat not in the pores of the walls in the middle section. The washcoat is not homogeneously distributed throughout the pores of the walls. The washcoat formed layered areas on the surface of the walls.

Example 3

A particle filter of having a three-way conversion (TWC) catalyst permeating the substrate wall was prepared at a washcoat loading of 2 g/in$^3$ (120 g/L) on a 300/8 filter substrate sized 4.66*5", whose characteristics are summarized in Table 1 below.

The method for coating the TWC catalyst washcoat onto the substrate was generally according to the improved technique discussed above. The specific steps were as follows.

(1) Impregnate a high surface area gamma alumina with a solution of rhodium nitrate (Rh(NO$_3$)$_3$). Calcine the Rh-impregnated alumina. Add water, octanol, and acetic acid. Add promotor precursors: barium nitrate (Ba(NO$_3$)$_2$) and zirconium nitrate (Zr(NO$_3$)$_4$). Mill the resulting material.

(2) Impregnate an oxygen storage component (OSC) with a solution of palladium (Pd(NO$_3$)$_2$) nitrate. Calcine the Pd-impregnated alumina. Add water, octanol, and acetic acid. Add promotor precursors: barium nitrate (Ba(NO$_3$)$_2$) and zirconium nitrate (Zr(NO$_3$)$_4$). Mill the resulting material.

(3) Combine the materials of (1) and (2) to form the final slurry/washcoat.

(4) Coat the substrate with the final slurry/washcoat.

For the preparation of Example 3, the processing (immersion) time was 3 seconds per side for a total of 6 seconds, which is a substantial decrease relative to Comparative Example 1. Due to a minimum of free ions, the dynamic viscosity was low (e.g., ~8 mPa·s at 20° C.) and in-wall coating/permeation was possible. The viscosity of the slurry/washcoat of Example 3 was 80% less than that of Comparative Example 1.

Figure 9A:
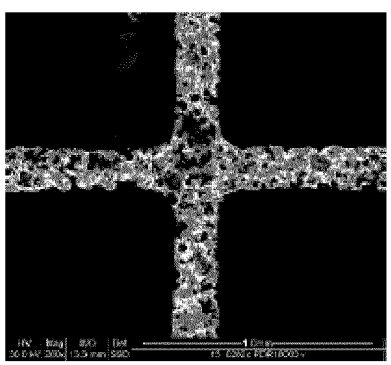
FIGS. 9A-C show SEM micrographs of inlet, middle, and outlet pieces of the catalyzed particulate filter of Example 3.
Figure 9B:
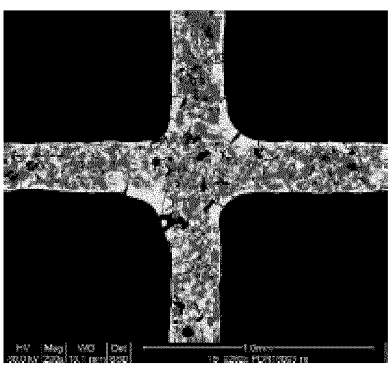
Figure 9C:
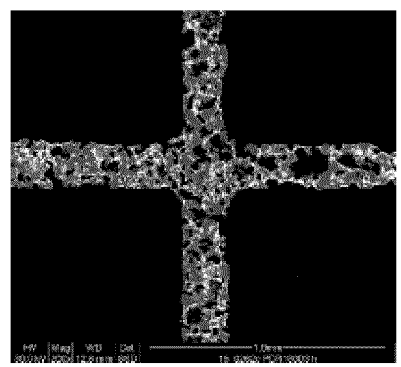

Example 3 coated nominally 50% of the washcoat on the inlet side and 50% on the outlet side, which allows for overlap of washcoat in the middle section of the filter. FIGS. 9A-C show SEM micrographs of inlet, middle, and outlet pieces of the catalyzed particulate filter of Example 3. The light areas show where there is washcoat. In the front, middle, and rear sections, the washcoat is entirely in the pores of the walls in the front, middle, and rear sections. There is minor washcoat in the corners of the middle section (FIG. 9B) where there was overlap during the coating process. The washcoat was homogeneously distributed throughout the pores of the walls. There is no appreciable layer of washcoat on the surface of the walls. That is, in areas of no overlap of washcoat, there is no layering of the catalytic material on the surface of the walls. Minor amounts of material may appear on the surface of the walls where there is overlap.

Example 4

A particle filter of having a three-way conversion (TWC) catalyst permeating the substrate wall was prepared at a washcoat loading of 1 g/in$^3$ (60 g/L) on a 300/8 filter substrate, whose characteristics are summarized in Table 1 below. The method of coating was in accordance with Example 3. Example 4 coated 100% of the washcoat on the inlet side with no washcoat on the outlet side.

Example 5

A particle filter of having a three-way conversion (TWC) catalyst permeating the substrate wall was prepared at a washcoat loading of 1.25 g/in$^3$ (75 g/L) on a 300/8 filter substrate sized 4.66*5", whose characteristics are summarized in Table 1 below. The method of coating was in accordance with Example 3. Example 5 coated 100% of the washcoat on the inlet side with no washcoat on the outlet side.

Example 6

Data

Table 1 summarizes the substrate characteristics, raw and coated according to the Examples.

TABLE 1

| Example | Washcoat (g/L) | Average Porosity (%) | Average Total Intrusion Volume (mL/g) | Mean Pore Diameter (volume) μm | % volume left |
|---|---|---|---|---|---|
| Raw Substrate A* | — | 63.3 | 0.68 | 19.9 | 100 |
| Comparative Example 2 | 120 | 57.2 | 0.50 | 6.63 | 90.3 |
| Example 3 - A | 120 | 54.4 | 0.41 | 8.65 | 85.1 |
| Example 3 - B | 120 | 54.5 | 0.40 | 8.36 | 86.0 |
| Example 4 - A | 60 | 60.6 | 0.57 | 18.20 | 95.7 |
| Example 5 | 75 | 57.2 | 0.47 | 13.80 | 90.3 |
| Raw Substrate B** | — | 62.0 | 0.67 | 18.24 | 100 |
| Example 4 - B | 60 | 58.8 | 0.53 | 14.63 | 94.8 |

*Raw Substrate A is representative of the raw substrate used for Comparative Example 2, Examples 3A, 3B, 4A, and 5.
**Raw Substrate B represents the raw substrate used for Example 4B.

Figure 10:
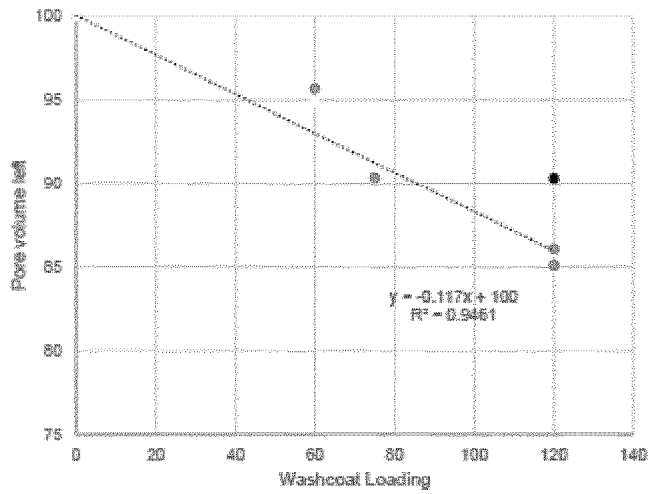
FIG. 10 is a graph summary of pore volume left (%) versus washcoat loading (g/L)

FIG. 10 provides a graphical summary of information in Table 1 (pore volume left (%) versus washcoat loading (g/L)), showing that the inventive coated filters have the characteristic that the coated porosity is linearly proportional to a washcoat loading of the TWC catalytic material. The data point for Comparative Example 2 does not fall on the line that corresponds to the data for the inventive examples.

Figure 11:
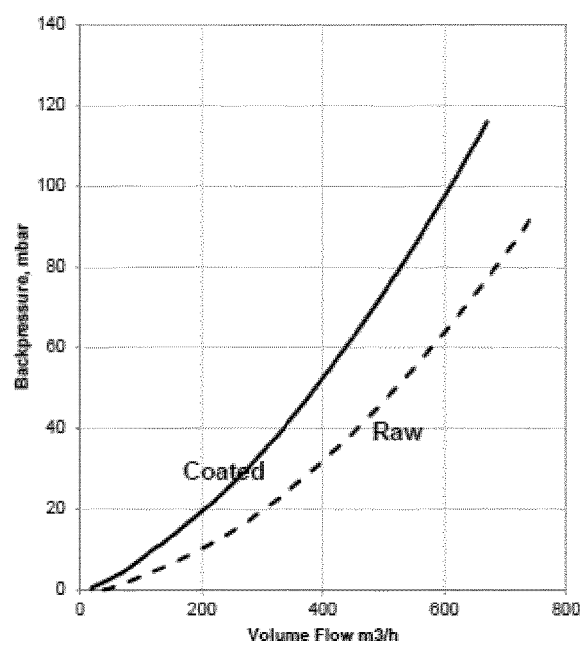
FIG. 11 is a graph of backpressure (mbar) versus volume flow (m$^3$/h) for Comparative Examples 1-2 versus a raw substrate.
Figure 12:
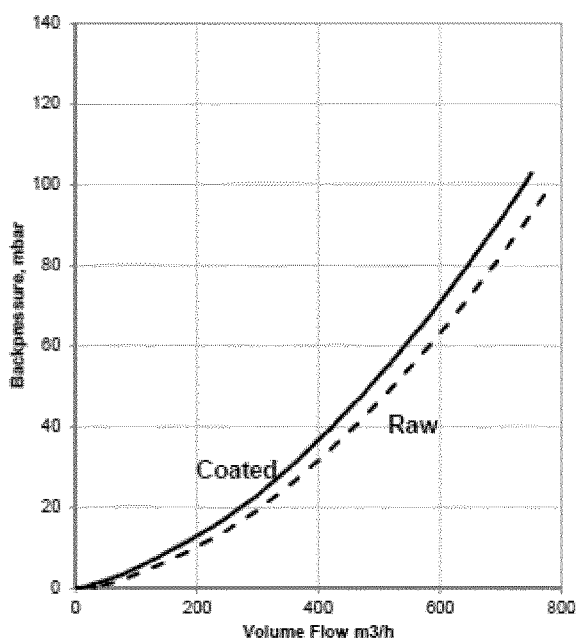
FIG. 12 is a graph of backpressure (mbar) versus volume flow (m$^3$/h) for Example 3 versus a raw substrate.

FIG. 11 is a graph of backpressure (mbar) versus volume flow (m$^3$/h) for Comparative Examples 1-2 (120 g/L) versus a raw substrate. FIG. 12 is a graph of backpressure (mbar) versus volume flow (m$^3$/h) for Example 3 (120 g/L) versus a raw substrate. The backpressure increase for Example 3 is significantly lower than the backpressure increase for Comparative Example 1.

Figure 13:
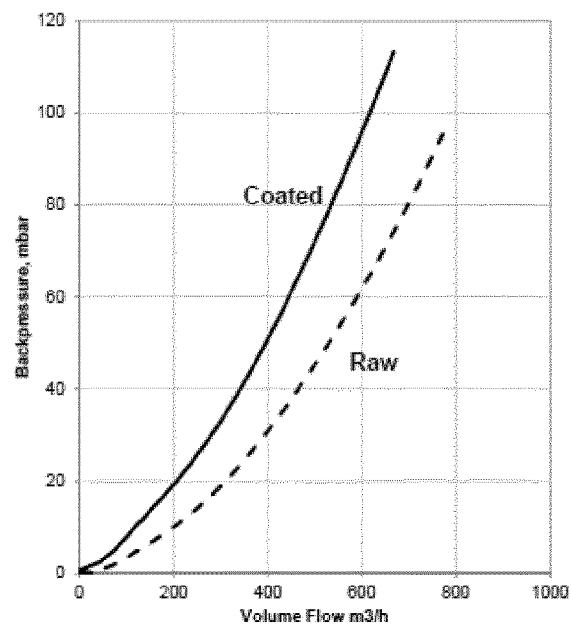
FIG. 13 is a graph of backpressure (mbar) versus volume flow (m$^3$/h) for a coated filter having 60 g/L made according to the traditional technique versus a raw substrate.
Figure 14:
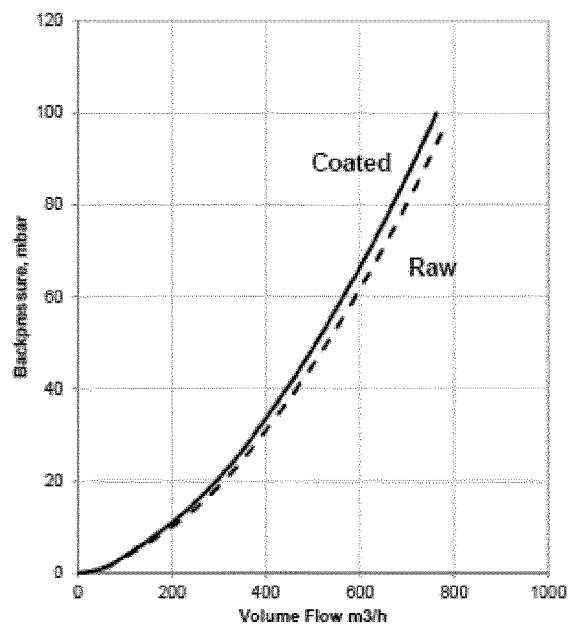
FIG. 14 is a graph of backpressure (mbar) versus volume flow (m$^3$/h) for a coated filter having 60 g/L made according to the improved/inventive technique versus a raw substrate.

FIG. 13 is a graph of backpressure (mbar) versus volume flow (m$^3$/h) for a coated filter having 60 g/L made according to the traditional technique versus a raw substrate. FIG. 14 is a graph of backpressure (mbar) versus volume flow (m$^3$/h) for the coated filter of Example 4-A having 60 g/L made according to the improved/inventive technique versus a raw substrate. The backpressure increase for the improved/inventive technique is significantly lower than the backpressure increase for the traditional technique.

Table 2 provides averaged percent backpressure increase relative to raw substrate for various coated filters made according to traditional technique versus the improved/inventive technique using a 300 cells per square inch (CPSI) and 12 mil walls filter substrate sized 4.66*5".

TABLE 2

| % increase of backpressure relative to raw substrate at a constant flow rate | | |
|---|---|---|
| Washcoat (g/L) | 120 | 60 |
| Traditional/prior art | 60.7 | 51.4 |
| Improved/inventive | 14.3 | 8.7 |

Tables 3-4 provide averaged backpressure for various coated filters made according to the improved/inventive technique using filter substrates sized 4.66*5" having varying cells per square inch (CPSI) and wall thickness (mil).

TABLE 3

| % increase of backpressure (Dp) relative to raw substrate at a constant flow rate of 600 m$^3$/h | | | | |
|---|---|---|---|---|
| | Washcoat 120 g/L | | | |
| CPSI/mil | 300/8 | 300/12 | 300/10 | 240/9 |
| Dp % increase | 30.6 | 17.4 | 16.7 | 68.1 |
| Standard deviation | 7.3 | 3.1 | — | — |

TABLE 4

| % increase of backpressure (Dp) relative to raw substrate at a constant flow rate of 600 m$^3$/h | | |
|---|---|---|
| | Washcoat 600 g/L | |
| CPSI/mil | 300/8 | 240/9 |
| Dp % increase | 10.4 | 10.7 |
| Standard deviation | 3 | — |

For low washcoat loading, the backpressure increase over raw substrate is low and independent of raw substrate CPSI/wall thickness, i.e. available volume for the washcoat in the wall. For high washcoat loading, the backpressure increase is higher and depends on wall thickness. With lower wall thickness, i.e. 300/8, there is less volume for the washcoat which leads to higher Dp % increase. The Dp % increase were calculated based on the Dp at 600 m$^3$/h but these are nearly independent of volume flow chosen for the calculation.

Figure 15:
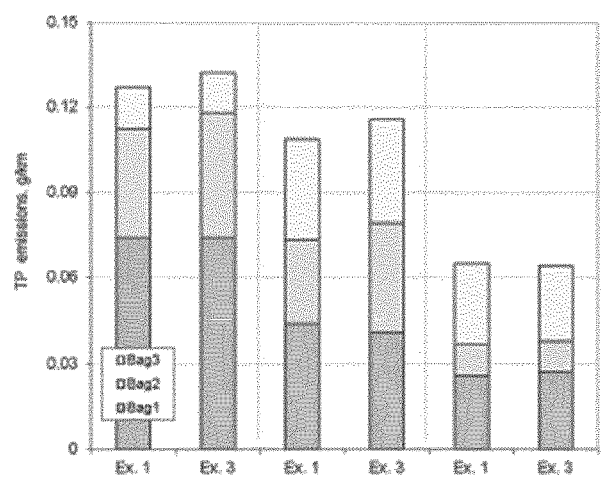
FIGS. 15-16 show NEDC performance data for Comparative Example 1 and Example 3.
Figure 16:
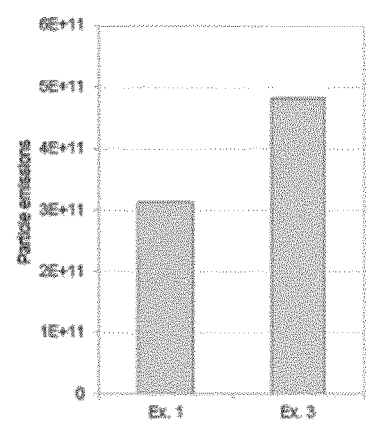

FIGS. 15-16 show NEDC performance data for Comparative Example 1 and Example 3. The FWCs were located in a close-coupled position. The emissions performance of coated filters prepared by the inventive/improved technique is comparable to those prepared by the prior art/traditional technique with the benefit of reduced increase in backpressure and improved efficiency in manufacturing.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

The invention claimed is:

1. An emission treatment system, downstream of a gasoline direct injection engine and suitable for treatment of an exhaust stream comprising hydrocarbons, carbon monoxide, nitrogen oxides, and particulates, the emission treatment system comprising a catalyzed particulate filter comprising:
   a three-way conversion (TWC) catalytic material that permeates a wall of a particulate filter;
   wherein the catalyzed particulate filter has a coated porosity that is less than an uncoated porosity of the particulate filter, and
   wherein the coated porosity ranges from 75% and 98% of the uncoated porosity and wherein there is no layering of the catalytic material on the surface of the walls of the particulate filter except optionally in areas of overlapped washcoat.

2. The emission treatment system of claim 1, wherein there is no layering of the TWC catalytic material on a surface of the wall except optionally in an area of overlapped washcoat.

3. The emission treatment system of claim 1, wherein a coated backpressure of the catalyzed particulate filter is non-detrimental to the performance of the engine.

4. The emission treatment system of claim 1, wherein the particulate filter comprises 200-300 cells per square inch (CPSI), the wall has a thickness in a range of 6-14 mil, and the catalyzed particulate filter a coated backpressure that is less than or equal to a 50% increase compared to an uncoated backpressure.

5. The emission treatment system of claim 1, wherein the particulate filter comprises a mean pore diameter in a range of about 13 μm to about 25 μm.

6. The emission treatment system of claim 1, wherein the wall has a thickness in a range of about 6 mils (152 μm) to about 14 mils (356 μm) and an uncoated porosity in a range of 55% to 70%.

7. The emission treatment system of claim 1, wherein the TWC catalytic material is formed from a single washcoat composition that permeates an inlet side and/or an outlet side of the particulate filter.

8. The emission treatment system of claim 7, wherein a first single washcoat layer is present on the inlet side along up to about 0%-100% of the axial length of the particulate filter from the upstream end and a second single washcoat layer is present on the outlet side along up to about 0%-100% of the axial length of the particulate filter from the downstream end, wherein at least one of the first and second single washcoat layers is present in an amount of >0%.

9. The emission treatment system of claim 7, wherein:
   a single washcoat layer is present on the inlet side along up to about 100% of the axial length of the particulate filter from the upstream end and there is not a washcoat layer on the outlet side, or a single washcoat layer is present on the outlet side along up to about 100% of the axial length of the particulate filter from the downstream end and there is not a washcoat layer on the inlet side.

10. The emission treatment system of claim 1, comprising the TWC catalytic material in an amount of about 1 g/in$^3$ to about 5 g/in$^3$ (about 60 g/L to about 300 g/L).

11. The emission treatment system of claim 1, wherein the uncoated porosity is a percentage of a volume of pores of the particulate filter relative to a volume of the particulate filter and is in a range of 55% to 70%.

12. The emission treatment system of claim 1, wherein the TWC catalytic material comprises rhodium, palladium, ceria or a ceria composite, and alumina.

13. The emission treatment system of claim 1, wherein the particulate filter comprises cordierite, alumina, silicon carbide, aluminum titanate, or mullite.

14. A catalyzed particulate filter, located in an emission treatment system downstream of a gasoline direct injection engine and suitable for treatment of an exhaust stream comprising hydrocarbons, carbon monoxide, nitrogen oxides, and particulates, the catalyzed particulate filter comprising:
   a particulate filter comprising a wall having a thickness in a range of about 6 mils (152 μm) to about 14 mils (356 μm) and a porosity in a range of 55% to 70%; and
   a three-way conversion (TWC) catalytic material in an amount of about 1.0 g/in$^3$ to about 4 g/in$^3$ (61 g/L to 244 g/L);
   wherein the TWC catalytic material permeates the wall; and
   wherein the coated porosity is between 75 and 98% of the uncoated porosity and wherein there is no layering of the catalytic material on the surface of the walls of the particulate filter except optionally in areas of overlapped washcoat.

15. A method of treating an exhaust gas comprising hydrocarbons, carbon monoxide, nitrogen oxides, and particulates, the method comprising:
   obtaining the catalyzed particulate filter of claim 14; and
   locating the catalyzed particulate filter downstream of a gasoline direct injection engine;
   wherein upon operation of the engine, exhaust gas from the engine contacts the catalyzed particulate filter.

16. A method of making a catalyzed particulate filter, the method comprising:
   obtaining a particulate filter;
   forming a slurry of a three-way conversion (TWC) catalytic material having a pH in a range of 2 to 7; and
   permeating the TWC catalytic material into a wall of the particulate filter to form the catalyzed particulate filter such that the catalyzed particulate filter has a coated porosity that is less than an uncoated porosity of the particulate filter, and
   wherein the coated porosity is between 75 and 98% of the uncoated porosity and wherein there is no layering of the catalytic material on the surface of the walls of the particulate filter except optionally in areas of overlapped washcoat.

17. The method of claim 16, wherein the slurry has a dynamic viscosity in a range of about 5 mPa·s to less than 40 mPa·s at 20° C. and a solids content of 0 wt.-% to 25 wt.-% solids.

18. The method of claim 16, wherein there is no layering of the TWC catalytic material on a surface of the wall except optionally in an area of overlapped washcoat.

19. The method of claim 16, wherein a coated backpressure of the catalyzed particulate filter is non-detrimental to the performance of the engine.

20. The method of claim 16, wherein the particulate filter comprises 200-300 cells per square inch (CPSI), the wall has a thickness in a range of 6-14 mil, and the catalyzed particulate filter a coated backpressure that is less than or equal to a 50% increase compared to an uncoated backpressure.

* * * * *